United States Patent [19]
Orem et al.

[11] Patent Number: 6,158,918
[45] Date of Patent: Dec. 12, 2000

[54] UNIVERSAL ADAPTOR FOR MOUNTING A SIGNAL DEVICE AND/OR DIRECTIONAL INDICATOR ON A MANUALLY ACTUATED QUARTERTURN VALVE

[76] Inventors: Gale E. Orem, 5634 Quail Ridge Dr., Charlotte, N.C. 28227; Jonathan D. Pierson, 9827 Thorn Ridge Dr., Indian Trail, N.C. 28079

[21] Appl. No.: 09/172,879

[22] Filed: Oct. 15, 1998

Related U.S. Application Data

[60] Provisional application No. 60/065,435, Oct. 15, 1997.

[51] Int. Cl.[7] .................................................. F16B 21/00
[52] U.S. Cl. ........................ 403/322.4; 403/13; 403/112
[58] Field of Search ................................ 403/13, 14, 116, 403/113, 112, 322.4, 383

[56] References Cited

U.S. PATENT DOCUMENTS

| | | | |
|---|---|---|---|
| 3,397,903 | 8/1968 | Archdale et al. | 403/113 |
| 4,943,181 | 7/1990 | Murphy | 403/116 |
| 5,356,237 | 10/1994 | sung | 403/383 |
| 5,366,312 | 11/1994 | Raines | 403/13 |
| 5,792,046 | 8/1998 | Dobrovolny | 403/374 |
| 5,993,101 | 11/1999 | Kohno et al. | 403/14 |

*Primary Examiner*—Lynne H. Browne
*Assistant Examiner*—John B. Walsh
*Attorney, Agent, or Firm*—Doughtery & Clements LLP

[57] ABSTRACT

A universal adaptor for easily and efficiently mounting a signal device and/or directional indicator on the shafts of most manually actuated quarterturn valves and a method of securing a variety of signal devices and/or directional indicators to a variety of manually actuated quarterturn valves. The universal adaptor includes a cylinder mounted in a hollow adaptor housing. The cylinder is rotatable in the housing by operating a handle connected to the cylinder and extending outwardly through a radial slot in the adaptor housing. An interchangeable insert is positionable in a bottom opening in the cylinder. The insert has a bore which can be selected to engage a desired valve shaft. The universal adaptor is mounted to a valve by inserting an appropriate insert into the cylinder and then securing the adaptor housing to the valve shaft housing. The invented adaptor also includes a top mounting plate that enables the invented adaptor to couple a variety of signal devices and/or directional indicators to the valve shaft. A signal device and/or directional indicator is mounted on the universal adaptor by securing the signal device and/or directional indicator to an appropriate top mounting plate and then securing the top mounting plate to the adaptor housing. A second interchangeable insert may be used to adapt the top mounting plate to the cylinder. The invented universal adaptor allows "off the shelf" mounting of a signal device and/or directional indicator to a manually actuated quarterturn valve.

14 Claims, 4 Drawing Sheets

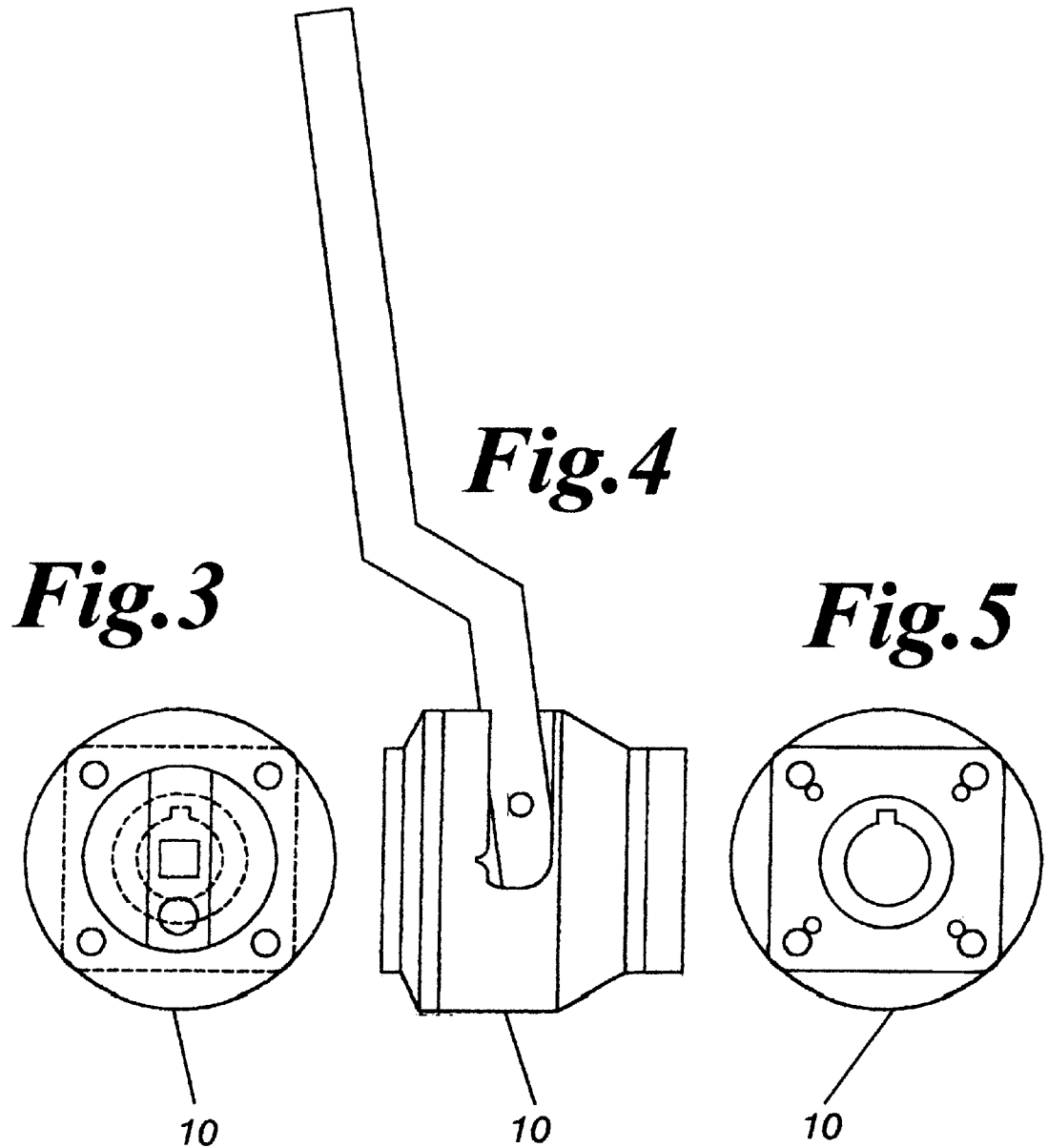
*Fig.3* *Fig.4* *Fig.5*

UNIVERSAL ADAPTOR FOR MOUNTING A SIGNAL DEVICE AND/OR DIRECTIONAL INDICATOR ON A MANUALLY ACTUATED QUARTERTURN VALVE

CROSS-REFERENCE TO RELATED APPLICATION

This application claims the benefit of U.S. Provisional Application No. 60/065,435, filed Oct. 15, 1997.

FIELD OF THE INVENTION

The present invention relates to an apparatus for simplifying the application of signal devices and directional indicators to manually actuated valves. More particularly, the invention relates to an universal adaptor for mounting signal devices and directional indicators on manually actuated quarterturn valves.

BACKGROUND

Manually actuated quarterturn valves are used in numerous applications where a valve disc must be precisely positioned and where the valve disc position must be precisely known. Because it is often very difficult to ascertain the position of a valve disc, numerous types of signal devices and directional indicators have been developed to accurately relay the exact position of the valve disc to a remote operator. Signal devices and directional indicators can be used separately or in combination, depending upon the requirements of the system in which the valve is being used, to indicate the position of the valve disc and to relay that information to a remote operator.

While the addition of signal devices and directional indicators is certainly beneficial, it is often very difficult and expensive to custom mount a given signal device and/or directional indicator on a particular valve. This is particularly problematic due to the infinite variety of valve shaft sizes and the large variety of signal devices and directional indicators. As a consequence of this lack of uniformity in valve shaft size, significant time and expense is required to retrofit a signal device and/or directional indicator to a particular manually actuated valve.

The existing process of adapting a signal device and/or directional indicator to a particular valve shaft often requires that the valves be removed from the pipes and then sent with the desired signal device and/or directional indicator to a remote location for custom assembly. At the remote location, the valve shaft is precisely measured, and, from those measurements, the hardware required to mount the signal device and/or directional indicator on the valve is manufactured. As a result, considerable time and expense is required to adapt a signal device and/or directional indicator to a particular valve. The amount of time involved in this process can result in significant plant downtime.

The customized mounting of signal devices and/or directional indicators on quarterturn valves must be repeated whenever a conventional valve having a signal device and/or directional indicator is replaced. Often times when a valve is replaced, the replacement valve does not have the same size of shaft as the replaced valve. Consequently, the hardware adapting the signal device and/or directional indicator to be attached to the replaced valve is either unusable on the replacement valve or must be modified to adapt to the structure of the replacement valve.

A need, therefore, exists for an universal adaptor that simplifies the application of signal devices and/or directional indicators to manually actuated quarterturn valves.

While there are numerous methods and means for attaching a signal device and/or directional indicator to a manually actuated quarterturn valve, none are known to have a similar structure to, or to function in the manner of, the present invention.

SUMMARY OF THE INVENTION

The present invention is a universal adaptor for mounting a signal device and/or directional indicator on a manually actuated quarterturn valve. The present invention provides "off the shelf" convenience to the process of mounting signal devices and/or directional indicators on most manually actuated valves, including quarterturn butterfly valves.

In a preferred embodiment, the universal adaptor includes a hollow adaptor housing, a cylinder rotatably positioned in the hollow adaptor housing, means for coupling the cylinder to manually actuated quarterturn valve shafts, means for coupling the cylinder to signal devices and/or directional indicators, and a radially extending handle connected to the cylinder for rotating the cylinder in the adaptor housing. The cylinder extends from the top of the housing to the bottom of the housing. A hollow brass sleeve is preferably positioned between the cylinder and the bottom portion of the adaptor housing for reducing friction when the cylinder is rotated in the adaptor housing. The adaptor housing includes a radial slot formed in a central region for movement of the handle. The radial slot includes notches for catching the handle.

A valve shaft coupling means connects the cylinder to a valve shaft housing, and a signal device and/or directional indicator coupling means connects the cylinder to a signal device and/or directional indicator. The valve shaft coupling means is preferably an interchangeable insert securably positionable in a bottom opening in the cylinder. The insert has a central longitudinal bore for receiving the shaft of a manually actuated quarterturn valve.

The cylinder and housing can be positioned on most valve shafts by selecting an insert having an appropriate sized and shaped central bore and positioning the insert into the cylinder bottom opening. The insert is preferably cylindrical in shape and is insertable into a cylindrical opening in the bottom of the cylinder. The insert and bottom opening of the cylinder are also keyed to prevent unwanted rotation of the insert with respect to the cylinder.

The interchangeable inserts are relatively small and inexpensive parts. The inserts can have a wide variety of sized and shaped bores, but each insert has a constant exterior shape that corresponds to the bottom opening of the cylinder. Replacing one interchangeable insert with another insert allows the invented adaptor to connect a wide variety of signal devices and/or directional indicators to a wide variety of manually actuated quarterturn valves with minimal time and expense.

A bottom mounting plate corresponding to the shape of the valve shaft housing is securable to the bottom end of the adaptor housing. The bottom plate has threaded openings that correspond to threaded openings in the bottom of the adaptor housing. Fasteners inserted through such openings secure the plate to the bottom of the adaptor housing. The bottom plate may include additional threaded openings that correspond to threaded openings in the valve shaft housing. Fasteners inserted through such additional threaded openings secure the adaptor housing to the valve shaft housing.

The directional indicator and/or signal device coupling means is preferably an interchangeable top mounting plate that is secured to the top of the adaptor housing. The top mounting plate preferably includes openings that are alignable with the threaded openings in the adaptor housing. Fasteners inserted through the openings of the top mounting plate and the threaded openings of the adaptor housing secure the top mounting plate to the adaptor housing. The top mounting plate may include additional openings that are alignable with threaded openings in the signal device and/or directional indicator. Fasteners inserted through the additional openings of the top mounting plate and the threaded openings in the signal device and/or directional indicator secure the signal device and/or directional indicator to the top mounting plate.

A central shaft extends through a central bore in the top mounting plate. The top end of the shaft engages the signal device and/or directional indicator. The bottom end of the shaft engages a recess in the top surface of the cylinder. The bottom end of the central shaft and the recess in the top surface of the cylinder have a matching fit and are preferably rectangular in cross-sectional shape. Thus, rotation of the cylinder in the adaptor housing causes the shaft to rotate which changes the output of the signal device and/or directional indicator. The directional indicator and/or signal device coupling means may additionally include a second insert positionable between the bottom end of the shaft and the recess in the cylinder. The second insert is similar in shape and function to the first insert.

The handle is secured to the cylinder and extends radially out through the adaptor housing and substantially perpendicular to the longitudinal axis of the cylinder. The handle extends outwardly through the radial slot in the central region of the adaptor housing. The handle permits a user, or operator, to manually actuate the cylinder. In a preferred embodiment, the handle is spring loaded in the vertical direction thereby requiring the user to apply force on the handle in the vertical direction before the handle can be turned in the horizontal direction. This minimizes the opportunity for accidental movement of the handle out of a desired position. The notches are cut into the radial slot to correspond to desired positions of the valve disc. The spring loading force allows the handle to be securely positioned in a selected notch, thereby positioning the valve disc in a desired position. A template is positioned around the radial slot to visually indicate the valve disc position corresponding to each notch.

In an alternative embodiment, the handle is spring loaded in the horizontal direction, thereby biasing the handle in a preferred direction when a user is not forcibly applying force to the handle to maintain the position of the handle. This "dead man" feature can be used to force the valve disc in either the fully open or fully closed position as required for a particular application. In another embodiment, the handle has a lock-out mechanism for preventing an unauthorized movement of the handle. In certain applications, this safety feature is necessary to avoid potentially catastrophic accidents.

When assembled, the cylinder, handle, valve shaft coupling means, and signal device and/or directional indicator coupling means form a single unit that is rotatable in the adaptor housing. Moving the handle causes the cylinder to rotate. Rotating the cylinder simultaneously rotates the valve shaft and valve disc and simultaneously rotates the shaft in the top mounting plate to cause a change in the signal device and/or directional indicator output.

The invented universal adaptor provides standardization and soundness of design for permitting various signal devices and/or directional indicators to be retrofitted to most manually actuated quarterturn valves.

OBJECTS OF THE INVENTION

Accordingly, one of the objects of the present invention is to provide an apparatus for simply and efficiently mounting various signal devices and/or directional indicators to most manually actuated quarterturn valves.

A further, and more particular, object of the invention is to provide an adaptor having interchangeable couplers which eliminates the need for costly and time consuming custom mounting of signal devices and/or directional indicators on manually actuated quarter turn valves.

Another object of the invention is to provide an means for reducing the expense and the time required for mounting a signal device and/or directional indicator on a manually actuated quarterturn valve.

Another object of the invention is to provide a method for simply and efficiently mounting a signal device and/or directional indicator on a manually actuated quarterturn valve.

BRIEF DESCRIPTION OF THE DRAWINGS

In view of these and other objects which will more readily appear as the nature of the invention is better understood, the invention consists in the novel combination and arrangement of parts hereinafter more fully described, illustrated and claimed with reference being made to the attached drawings, in which:

FIG. 3 is a top view of the invented universal adaptor;

FIG. 4 is a side view of the invented universal adaptor;

FIG. 5 is a bottom view of the invented universal adaptor;

DETAILED DESCRIPTION

Figure 1:
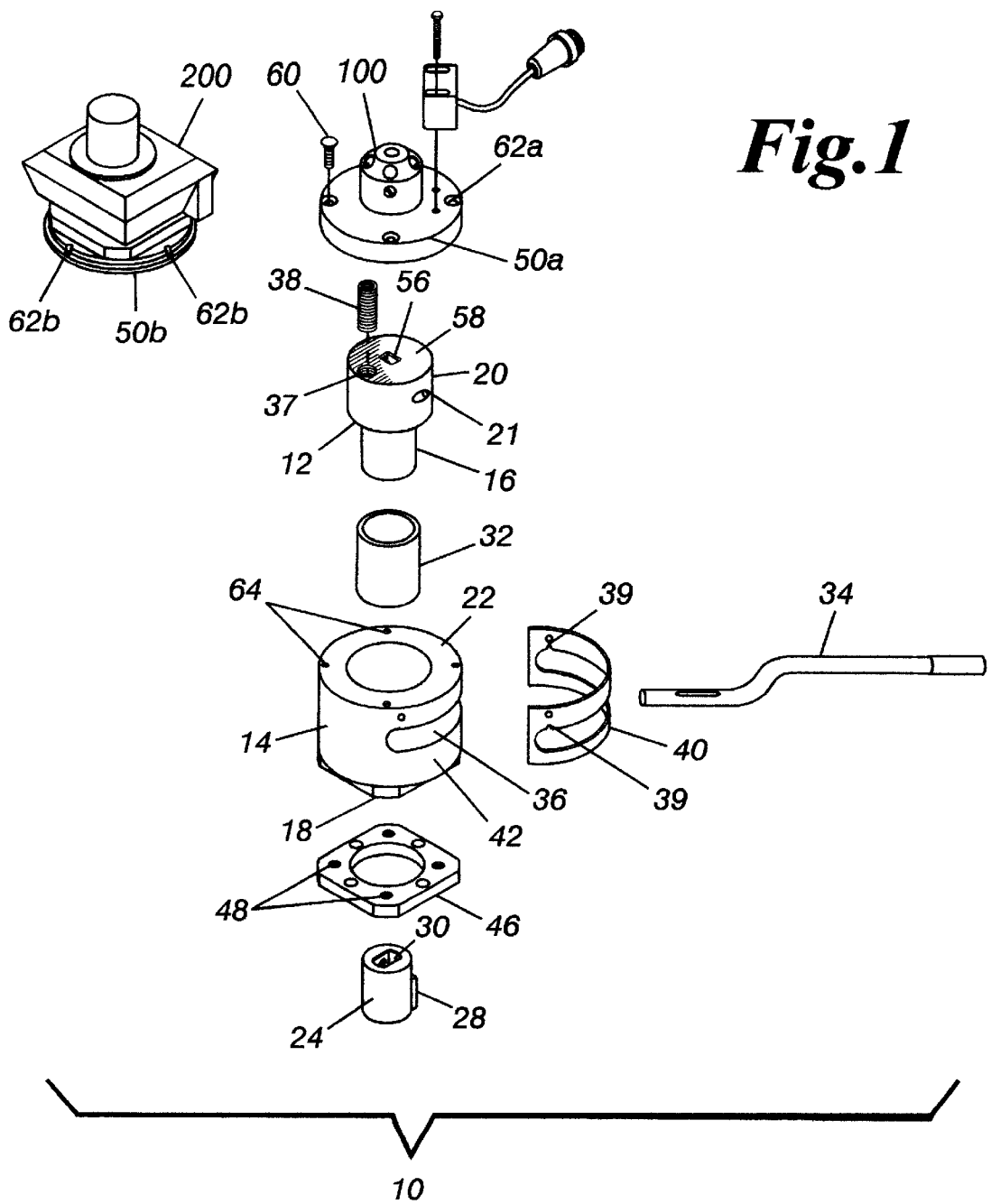
FIG. 1 is an exploded top view of an universal adaptor for mounting a signal device and/or directional indicator on a manually actuated quarterturn valve according to the invention.
Figure 2:
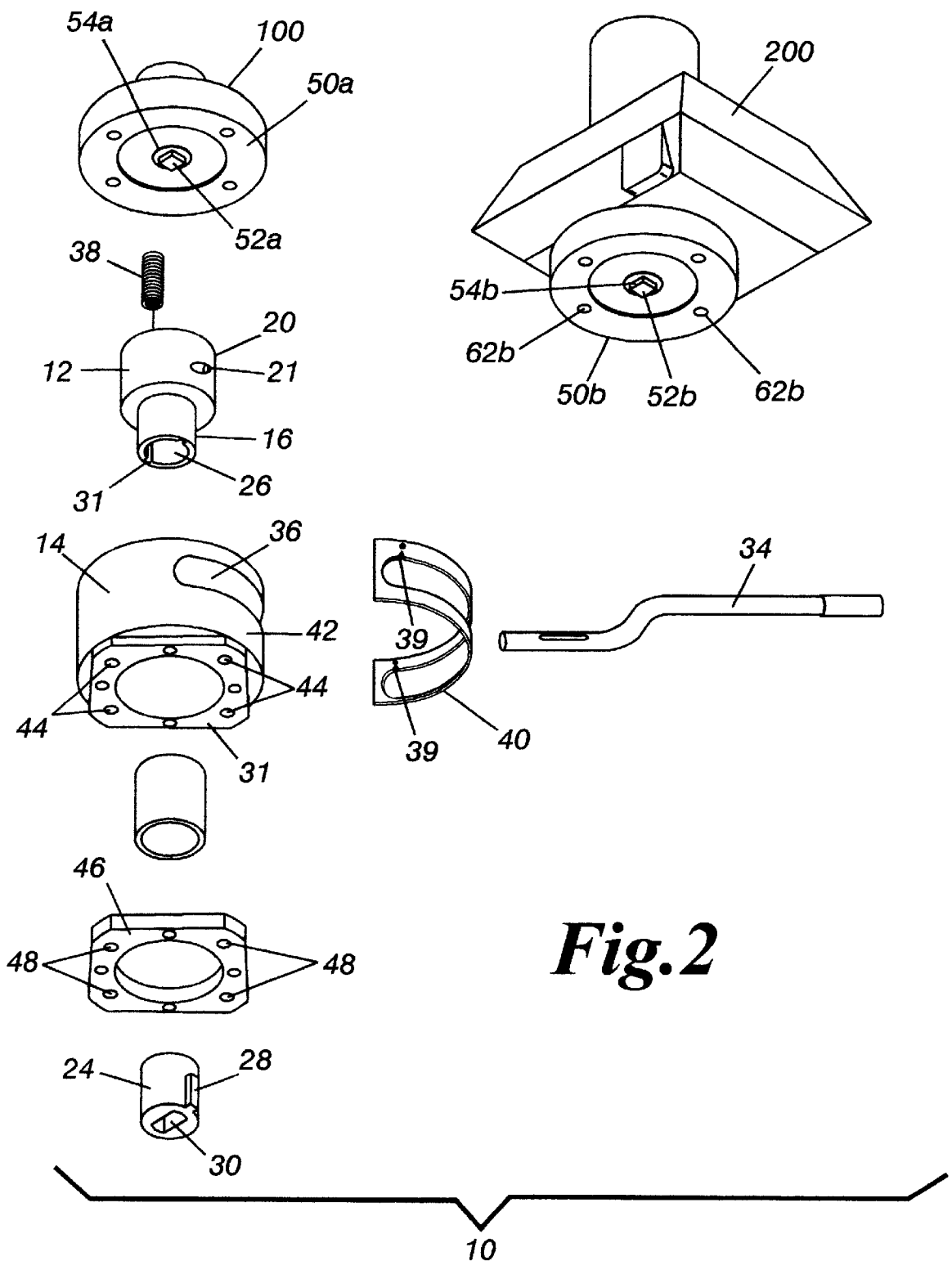
FIG. 2 is an exploded top view of the adaptor of FIG. 1.

Referring now to the drawings, FIGS. 1 and 2 show an exploded view of the invented universal adaptor 10 having means for coupling a variety of sized and shaped valve shafts to most signal devices and/or directional indicators.

The invented universal adaptor, shown generally at 10, comprises a hollow adaptor housing 14, a cylinder 12 rotatably positioned in the hollow adaptor housing 14, means for coupling the cylinder to manually actuated quarterturn valve shafts, means for coupling the cylinder to signal devices and/or directional indicators, and a radially extending handle 34 connected to the cylinder 12 for rotating the cylinder 12 in the adaptor housing 14. A bottom portion 16 of the cylinder 12 extends downward in the adaptor housing 14 to a point where the cylinder 12 is flush with the bottom 18 of the adaptor housing 14. A top portion 20 of the cylinder 12 extends upward in the adaptor housing 14 to a point where the cylinder 12 is flush with the top 22 of the adaptor housing 14. An anti-friction sleeve 32 is positioned around the bottom portion 16 of the cylinder 12 to assist the rotation of the cylinder 12 in the adaptor housing 14. The sleeve 32 is preferably made of brass.

Although numerous alternatives are contemplated, the adaptor housing 14 is preferably cylindrical in shape and comprises a top 22 for positioning the device coupling means, a radial slot 36 for receiving the handle 34 therethrough, and a bottom 18 for securing the valve shaft housing to the adaptor housing 14. The top 22 includes a plurality of threaded openings 64 for receiving fasteners therein. The radial slot 36 preferably has a valve disc position indicator formed on the periphery of the slot 36. The bottom of the adaptor housing 14 includes a plurality of threaded openings 44 for receiving fasteners therein.

The means for coupling the cylinder to most manually actuated quarterturn valve shafts is preferably an interchangeable insert 24. The insert 24 is removably positionable in a keyed opening 26 in the bottom portion 16 of the cylinder 12. The insert 24 has an extension 28 for engaging the keyed portion of the opening 26 in the bottom portion 16 of the cylinder 12. The insert 24 has a central longitudinal bore 30 for accepting the valve shaft of a manually actuated quarterturn valve. The invented universal adaptor 10 can be attached to most valve shafts by selecting and inserting an insert 24, having a central bore 30 corresponding to the size and shape of the given valve shaft, into the keyed opening 26 in the bottom portion 16 of the cylinder 12. The keyed opening 26 in the bottom portion 16 of the cylinder 12 and the matching extension 28 for engaging the keyed opening 26 in the bottom portion 16 of the cylinder 12 prevent unwanted rotation of the insert 24 with respect to the cylinder 12. The interchangeable inserts 24 are relatively small and inexpensive parts. The inserts 24 can have a wide variety of sized and shaped bores, but each insert 24 has a constant exterior shape that corresponds to the bottom opening 26 of the cylinder 12. The bottom opening 26 of the cylinder 12 is shaped to fit double-D, round and keyed, and squared shaped inserts 24 and preferably shaped to fit round and keyed inserts. Replacing one interchangeable insert with another insert allows the invented adaptor 10 to connect a wide variety of signal devices and/or directional indicators to a wide variety of manually actuated quarterturn valves with minimal time and expense.

The handle 34 is inserted through the radial slot 36 in the adaptor housing 14 and is secured to an upper portion 20 of the cylinder 12. The handle 34 is preferably received in an axial handle receiving opening (not shown) formed in the upper portion 20 of the cylinder 12 that extends radially outward. The handle 34 is secured by inserting a pin or fastener through a fastening hole 21 formed in the upper portion 20 of the cylinder 12. The fastener fits through the handle 34 and the cylinder 12 to secure the handle 34 to the cylinder 12. The handle 34 allows an operator to rotate the cylinder 12 in the adaptor housing 14. The radial slot 36 permits rotation of the cylinder 12 in the adaptor housing 14 over a range of degrees. Rotation of the cylinder 12 simultaneously causes the valve disc of the quarterturn valve to move and the signal device and/or directional indicator to reflect the change in the position of the valve disc.

In one embodiment, the handle 34 is horizontally spring loaded to bias the valve disc in either a fully open position or a fully closed position unless force is applied to the handle to temporarily keep the valve disc in a desired position. Once the handle 34 is released, the spring will force the handle 34 back to its initial position. In another embodiment, the handle 34 has a lock-out mechanism (not shown) for preventing an unauthorized movement of the handle 34.

In another embodiment, the adaptor housing 14 includes a series of intermittently positioned holes (not shown) that correspond to a set position of the valve disc. The holes are axially formed from the top 22 of the adaptor housing 14 through the upper lip of the radial slot 36 of the adaptor housing 14. A series of pins are received within at least one of the holes for catching the handle. The handle 34 has a corresponding recess (not shown) for receiving a pin. Positioning the recess of the handle 34 against a given pin places the valve disc in a predetermined level of openness.

In a preferred embodiment, a position indicating plate 40 is attached to an outside surface 42 of the adaptor housing 14. The position indicating plate 40 and adaptor housing 14 preferably have a series of stepped notches 39 that correspond to a set position of the valve disc. The notches 39 are intermittently formed on the periphery of the radial slot 36 of the adaptor housing 14 and catch the handle. Positioning the handle 34 in a given notch places the valve disc in a predetermined level of openness. The position of the valve disc can then be visually determined by an operator based on the indicia on the position indicator plate 40 corresponding to the position of the handle 34 in a notch 39.

In the aforementioned embodiment, the cylinder 12 further includes a spring 38 that is received in a bore 37 in the top portion 20 of the cylinder 12. The spring 38 is positioned over the end of the handle 34 to bias the handle against a notch 39. Consequently, the handle 34 must be forced downward against the force of the spring 38 before it can be rotated in the slot 36. Because the handle 34 is vertically spring loaded, the handle 34 cannot accidently moved out of one of the notches 39. When coupling the invented adaptor 10 to a quarterturn valve, the adaptor housing 14 is fastened to the valve shaft housing. Preferably, screws are inserted through threaded holes commonly found in the valve shaft housing and are tightened in corresponding threaded holes 44 located in the bottom 18 of the adaptor housing 14.

The universal adaptor 10 may additionally include a bottom mounting plate 46. The bottom mounting plate 46 is secured to the bottom 18 of the adaptor housing 14. The bottom mounting plate 46 enables the adaptor housing 14 to be flushly mounted on a variety of sized valve shaft housings. The bottom mounting plate 46 includes threaded holes 48 that are alignable with the threaded holes in the valve shaft housing and the threaded holes 44 in the bottom 18 of the adaptor housing 14.

The means for coupling signal devices and/or directional indicators to the cylinder is preferably an interchangeable top mounting plate 50a, 50b secured by fasteners 60 over the top 22 of the adaptor housing 14. The fasteners 60 extend through threaded holes 62a, 62b in the top mounting plate 50a, 50b and are secured in threaded holes 64 in the top 22 of the housing 14. A shaft 52a, 52b extends through a central hole 54a, 54b in the top mounting plate 50a, 50b. The bottom portion of the shaft 52a, 52b engages a recess 56 in the top surface 58 of the top portion 20 of the cylinder 12. The bottom end of the shaft 52a, 52b and the recess 56 in the top surface 58 of the top portion 20 of the cylinder 12 have a matching fit and are preferably rectangular in cross-sectional shape. The top portion of the shaft 52a, 52b engages the signal device and/or directional indicator.

Top mounting plates having a variety of sized and shaped shafts can be interchangeably positioned on the adaptor housing 14. When a signal device and/or directional indicator is coupled to the invented adaptor 10, a top mounting plate is selected, the signal device and/or directional indicator is secured to the top mounting plate and the top mounting plate is secured to the adaptor housing. FIGS. 1 and 2 show a signal device 100 and a directional indicator 200 that are interchangeably securable to the adaptor housing 14. Signal device 100 is secured to top mounting plate 50a. Shaft 52a extends downward through hole 54a. Screws 60 extend through threaded holes 62a in the top mounting plate 50a and are secured in threaded holes 64 in the top 22 of the housing 14. Directional indicator 200 is secured to top mounting plate 50b. Shaft 52b extends downward through hole 54b. Screws 60 extend through threaded holes 62b in the top mounting plate 50b and are secured in threaded holes 64 in the top 22 of the housing 14.

The directional indicator and/or signal device coupling means may also include a second interchangeable insert (not shown) positionable between the bottom end of the shaft 52 in the top mounting plate 50 and the recess 56 in the top surface 58 of the top portion 20 of the cylinder 12. The second insert has a constant shape and sized lower end for engaging the recess 56. The top end has a bore of various shapes and sizes to accommodate the shaft 52 of a given top mounting plate 50. The second insert is similar in shape and function to the first insert 24.

The cylinder 12 may also have a variety of sized and shaped bottom openings 26 to fit an additional adapter (not shown) that is used to fit different sized and shaped inserts. For example, the bottom opening 26 of the cylinder 12 may have a squared bore that is ideally suited for fitting the additional adapter. The additional adapter has a squared shaped cross-section that allows the invented universal adaptor 10 to couple with different sized and shaped inserts which are in turn coupled with valves having different valve shaft shapes and sizes.

FIG. 3 is a top view of the invented universal adaptor 10 illustrating the vertical alignment of the adaptor 10. FIG. 4 is a side view of the invented universal adaptor 10. FIG. 5 is a bottom view of the invented universal adaptor 10 illustrating the vertical alignment of the adaptor 10.

Figure 6:
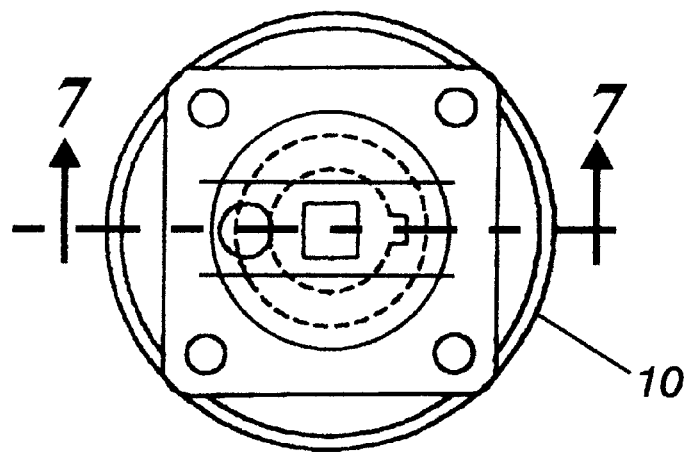
FIG. 6 is a top plan view of the invented universal adaptor.
Figure 7:
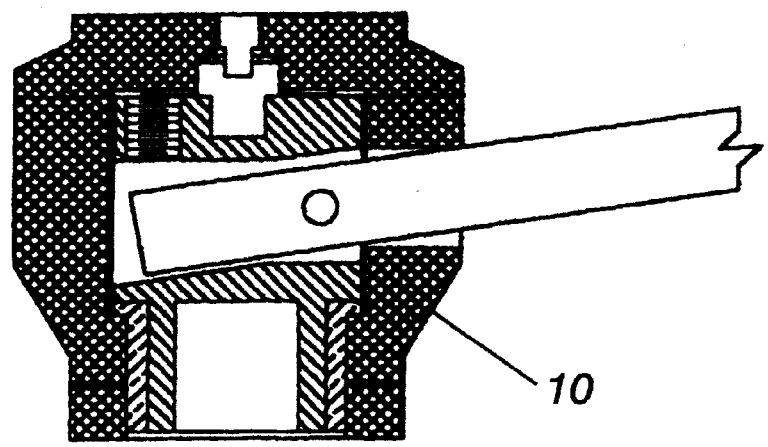
FIG. 7 is a cross-sectional view of the invented universal adaptor taken along line 7—7 of FIG. 6.
Figure 8:
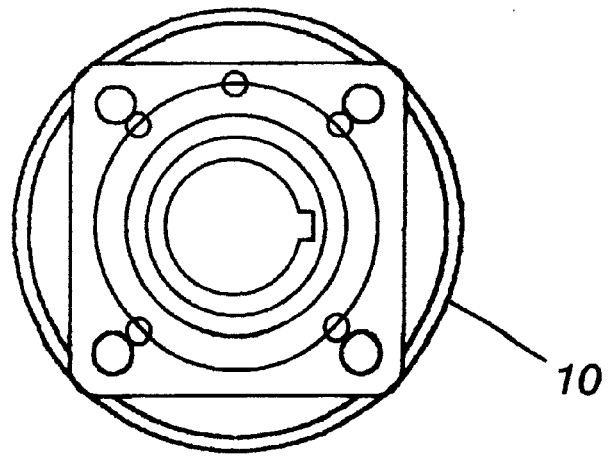
FIG. 8 is a bottom plan view of the invented universal adaptor.

FIG. 6 is a top plan view of the invented universal adaptor 10 illustrating the general assembly of the adaptor. FIG. 7 is a cross-sectional view of the invented universal adaptor 10 taken along line 7—7 of FIG. 6. FIG. 8 is a bottom plan view of the invented universal adaptor 10 illustrating the general assembly of the adaptor.

When assembled, the cylinder 12, handle 34, valve shaft coupling means, and signal device and/or directional indicator coupling means form a single unit that is rotatable in the adaptor housing. Moving the handle 34 causes the cylinder 12 to rotate. Rotating the cylinder 12 simultaneously rotates the valve shaft and valve disc and simultaneously rotates the shaft 52a, 52b in the top mounting plate 50a, 50b to cause a change in the signal device and/or directional indicator output.

In operation, when using the universal adaptor 10 to mount a signal device and/or directional indicator on a manually actuated valve shaft, an insert is selected having an appropriate sized and shaped bore for engaging the valve shaft, the insert is positioned into the bottom opening of the cylinder, the insert is positioned over the valve shaft, the adaptor housing is secured to the valve shaft housing, a top mounting plate having an appropriate sized and shaped shaft is selected, the desired signal device and/or directional indicator is secured to the top mounting plate, and the top mounting plate is secured to the adaptor housing. Additionally, a second interchangeable insert is selected, and inserted between the end of the shaft of the top mounting plate and the recess in the top surface of the cylinder.

SUMMARY OF THE ACHIEVEMENT OF THE OBJECTS OF THE INVENTION

From the foregoing, it is readily apparent that we have invented an universal adaptor for simply and efficiently mounting a signal device and/or directional indicator on a valve shaft housing of a manually actuated quarterturn valve. The invented universal adaptor is an apparatus that allows a manually actuated valve to be easily configured with a signal device and/or directional indicator. The present invention avoids the necessity for custom installation required in the past. The present invention reduces the time and expense involved in custom mounting a signal device and/or directional indicator on a manually actuated quarter-turn valve.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A universal adaptor for mounting a signal device and directional indicator on a manually actuated quarterturn valve having a valve shaft, associated valve shaft coupling and a valve shaft housing, said adaptor comprising:

a hollow adaptor housing;

a cylinder rotatably positioned in said adaptor housing, said cylinder comprising:

a top end having a top surface; said top end comprising a recess formed in the top surface; and a bottom end comprising a notched bottom opening for receiving said valve shaft coupling and for coupling said cylinder to the manually actuated quarterturn valve shaft;

means, associated with said adapter housing for coupling said cylinder to at least one of the devices of the group consisting of signal devices and directional indicators; and a radially extending handle connected to said cylinder for rotating said cylinder in said housing;

wherein operating said handle rotates said cylinder in said adaptor housing thereby simultaneously rotating the valve shaft and changing an output from the at least one coupled device by causing said coupled device to rotate simultaneously with the valve shaft in the adaptor housing.

2. The universal adaptor of claim 1 wherein said adaptor housing comprises:

a top for positioning said means for coupling, said top having a plurality of threaded openings for receiving fasteners therein;

a radial slot for receiving said handle therethrough; and a bottom for securing the valve shaft housing to said adaptor housing, said bottom having a plurality of threaded openings for receiving fasteners therein.

3. The universal adaptor of claim 2 wherein said means for coupling comprises a top mounting plate secured to said top of said adaptor housing.

4. The universal adaptor of claim 3 wherein said top mounting plate comprises:

a central opening; and a shaft positioned in said central opening, said shaft engaging the at least one of the devices of the group consisting of signal devices and directional indicators.

5. The universal adaptor of claim 4 wherein said means for coupling further comprises an interchangeable insert positionable between the bottom end of said shaft of said top mounting plate and said recess of said top end of said cylinder.

6. The universal adaptor of claim 4 wherein said shaft of said top mounting plate engages said recess in the top surface of said cylinder.

7. The universal adaptor of claim 4 wherein said top mounting plate further comprises a plurality of threaded openings for receiving fasteners therethrough, said plurality of threaded openings of said top mounting plate alignable with said plurality of threaded openings of said top of said adaptor housing.

8. The universal adaptor of claim 2 wherein said radial slot comprises a plurality of notches intermittently formed along the periphery of said radial slot for catching said handle.

9. The universal adaptor of claim 8 wherein said handle is movably positioned in said radial slot in said adaptor housing.

10. The universal adaptor of claim 9 wherein said cylinder further comprises:
   a spring;
   a vertical bore formed in the top surface of said top end for receiving said spring; and
   a radially extending opening for receiving said handle therethrough.

11. The universal adaptor of claim 10 wherein said spring contacts the end of said handle received by said radially extending opening of said cylinder and biases said handle against one of said plurality of notches of said radial slot.

12. The universal adaptor of claim 2 further comprising a bottom plate for flush mounting said adaptor housing to the valve shaft housing, said bottom plate having a plurality of threaded openings for receiving fasteners therethrough, said openings of said bottom plate alignable with said openings of said adaptor housing.

13. The universal adaptor of claim 1 wherein said valve shaft coupling comprises an interchangeable keyed cylindrical insert positionable in said notched bottom opening in said cylinder, said insert having a bore for engaging the valve shaft.

14. The universal adaptor of claim 1 further comprising an antifriction sleeve positioned around said bottom end of said cylinder for assisting the rotation of said cylinder in said adaptor housing.

* * * * *